US008494713B2

(12) United States Patent
Falk et al.

(10) Patent No.: US 8,494,713 B2
(45) Date of Patent: Jul. 23, 2013

(54) DEVICE, SYSTEM, AND METHOD FOR AUTHORIZING VEHICLE ONLINE SERVICES DURING DRIVING

(75) Inventors: Rainer Falk, Erding (DE); Florian Kohlmayer, Starnberg (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 13/130,932

(22) PCT Filed: Nov. 4, 2009

(86) PCT No.: PCT/EP2009/064629
§ 371 (c)(1),
(2), (4) Date: Aug. 5, 2011

(87) PCT Pub. No.: WO2010/057776
PCT Pub. Date: May 27, 2010

(65) Prior Publication Data
US 2011/0288724 A1 Nov. 24, 2011

(30) Foreign Application Priority Data
Nov. 24, 2008 (DE) .......................... 10 2008 058 632

(51) Int. Cl.
G06F 7/00 (2006.01)
(52) U.S. Cl.
USPC ............................................ 701/36; 701/31.4
(58) Field of Classification Search
USPC ................. 701/36, 1; 702/182; 715/815, 700, 715/749, 847, 810; 726/4; 705/37, 64
See application file for complete search history.

(56) References Cited

U.S. PATENT DOCUMENTS

| 7,149,653 | B2* | 12/2006 | Bihler et al. ................... 702/182 |
| 7,236,857 | B2* | 6/2007 | Schnier et al. ..................... 701/1 |
| 7,895,530 | B2* | 2/2011 | Leavitt et al. .................. 715/810 |
| 2002/0070852 | A1 | 6/2002 | Trauner et al. |
| 2002/0152264 | A1 | 10/2002 | Yamasaki |
| 2004/0083032 | A1 | 4/2004 | Schnier et al. |
| 2005/0102074 | A1 | 5/2005 | Kolls |
| 2007/0234223 | A1 | 10/2007 | Leavitt et al. |

FOREIGN PATENT DOCUMENTS

| DE | 199 52 857 C1 | 8/2001 |
| DE | 103 02 924 B3 | 4/2004 |
| WO | WO 03/039914 A1 | 5/2003 |

* cited by examiner

Primary Examiner — Thomas Black
Assistant Examiner — Robert Payne
(74) Attorney, Agent, or Firm — Cozen O'Connor

(57) ABSTRACT

A device for authorizing an online service during driving in a vehicle. Contents of an online service are authorized according to the vehicle state. The device includes an electronic control unit, a graphical output apparatus, and a communication interface. A system that includes the device and a server, which is not located in the vehicle and which is connected to the communication interface through a wireless connection for the exchange of data. A method, having the following steps: the vehicle state of the vehicle is detected. According to the vehicle state, it is checked if a requested online service or certain contents of a requested online service are authorized for display during driving. According to available or ascertainable data on the ability of the requested online service to be authorized during driving, the requested online service is either blocked or authorized in a limited or complete manner. The result is depicted on the graphical output apparatus.

26 Claims, 3 Drawing Sheets

PRIOR ART

DEVICE, SYSTEM, AND METHOD FOR AUTHORIZING VEHICLE ONLINE SERVICES DURING DRIVING

PRIORITY CLAIM

This is a U.S. national stage of Application No. PCT/EP2009/064629, filed on Nov. 4, 2009, which claims priority to German Application No: 10 2008 058 632.3, filed: Nov. 24, 2008, the contents of which are incorporated herein by reference.

BACKGROUND OF THE INVENTION

1. Field of the Invention

The invention relates to an apparatus, a system and a method for authorizing vehicle online services in the course of driving.

2. Related Art

Some functions of a vehicle, such as the display of a television program or the playback of a DVD, cannot be used in the course of driving so as not to distract the driver too greatly. The retrieval of online services in a vehicle with Internet capability can also distract the driver to a considerable degree in the course of driving. However, some online services can also provide important information such as queue reports, black ice warnings, or severe weather forecasts for the driver in the course of driving.

It is known that online services in a vehicle can no longer be used as soon as the speed of travel has exceeded a particular value. Safety zones that categorize Internet pages according to particular access authorizations are also known. Furthermore, there are devices for notifying online applications of whether the vehicle is stationary or travelling, whereupon called online applications customize their presentation accordingly.

This to some extent results in information which is entirely beneficial in the course of driving being unavailable to the driver.

SUMMARY OF THE INVENTION

It is therefore an object of the present invention to notify the driver of important and beneficial information in the course of driving without adversely affecting driving safety.

The application proposes an apparatus for authorizing an online service in the course of driving in a vehicle that has an electronic control unit, a graphical output device and a communication interface for wireless data interchange with a server that is not situated in the vehicle, wherein the apparatus is designed such that it presents or does not present particular contents of a called online service on the basis of the driving state.

In addition, a sensor device may be set up for capturing the condition of the driver and, by way of example, measures the frequency of eyelid movements to recognize tiredness and uses an alcohol sensor to detect whether alcohol has been consumed to additionally involve the measurement results in the authorization of online services in the course of driving. The effect achieved by this is that an online service is authorized only if display of the online service does not present a risk to the attentiveness of the driver in the course of driving.

The graphical output device may be in the form of a sensor screen, for example, to allow online services to be activated quickly and easily in the course of driving.

One embodiment of the invention relates to a system for authorizing an online service in the course of driving in a vehicle, which system comprises an apparatus and a server, the latter being connected to the communication interface for the purpose of data interchange via a wireless link. The server and also the communication interface are designed for authorizing online services in the course of driving.

A method for authorizing an online service in the course of driving in a vehicle, in which wireless interchange is used to authorize particular contents of an online service on the basis of the driving state, provides for the following steps: The driving state of the vehicle (1) is detected. On the basis of the driving state, a check is performed to determine whether a retrieved online service or particular contents of a retrieved online service are authorized for display in the course of driving. Available or ascertainable data relating to the authorizability of the retrieved online service in the course of driving are taken as a basis either for blocking or for restrictedly or completely authorizing the retrieved online service. The result is displayed via a graphical output device on which the retrieved online service is presented in irretrievable form or in restrictedly retrievable form or in completely retrievable form. This ensures that, in the course of driving, no online service is authorized and hence presented that distracts the driver of a vehicle from attentiveness to the traffic situation.

A GPRS network, a UMTS network, a WiMAX connection, another mobile radio network or a WLAN can be used for the wireless data interchange between the communication interface and the server. This means that an already available wireless data transmission network can be used.

The authorization information may be encodable into a certificate directly as an attribute in the case of communication which is protected using a network protocol for secure data transmission. The SSL/TLS protocol can be used to protect the data interchange by virtue of the additional 'a' after 'http' as hypertext transfer protocol secure.

A certification center allocating user accounts can also issue certificates for online services which can be used safely in the course of driving. The certificates can be issued on the basis of the nature and origin of an online service or after checking a possibly suitable online service. An online service that is provided directly by an automobile manufacturer or a motor vehicle association taking special account of the attentiveness of the driver to the traffic, for example, may have been classified as being able to be used safely in the course of driving.

Information relating to the useability of an online service in the course of driving can be fetched using authorizations recently stored by the runtime environment, or stored configurations, by comparing the origin data in the network with defined patterns. Authorizations already stored by the runtime environment or stored configurations by virtue of comparison of URLs with defined patterns provide information about the useability of an online service in the course of driving, the defined patterns being able to be firmly prescribed or being able to be configured by a workshop or by a user himself.

In order to allow the information data transmitted by the server to be customized on the basis of driving state, it is possible that when a message or a request for download of an online service is sent, the driving state is transmitted as well.

In one advantageous development, a URL-rewrite can be effected as soon as the driving state has changed. The runtime environment can thus create a new version of the origin data in the network when the driving state changes, whereupon the selected online service provides all, only particular or absolutely no contents on the basis of the driving state.

Alternatively, an online service which contains dynamic contents can request the current vehicle status and customize its presentation accordingly. When the driving state changes, the runtime environment can also prompt reloading of a web page or restarting of a running program so that the presentation is customized to suit the altered conditions immediately.

A request for the authorization information can also be made by a server set up specifically for that purpose. Hence, online service providers are no longer responsible for classifying their online services on the basis of driving state.

In the course of driving, only online services stored in the control unit can be dialed up. So as not to divert the attentiveness of the driver in the course of driving through the manual input of a web page which is not stored, only online services already stored can be accessed in the course of driving.

Online services that are permitted in the course of driving can be retrieved using a menu or a softkey—a key performs different functions on the basis of a screen display—or voice recognition in order to place as little additional load as possible on the attentiveness of the driver in the course of driving.

Online services that are not permitted in the course of driving can be displayed as deactivated, for example on a grey background. This immediately tells the driver which of the called online services cannot be displayed in the course of driving.

Not only requested messages and information but also incoming messages and information, for example in the form of an SMS, can be displayed or not displayed on the basis of driving state.

In the case of incoming messages and information, the address of the sender can be checked either using the SSLITLS protocol when there is an authorized connection to the server or by a digital certificate which authorizes the transmitter.

For display in the course of driving, it is possible that, in the case of incoming messages and information, the message itself is also digitally signed using a digital certificate. Only subsequently loadable application software digitally signed by a provider and classified as being able to be used in the course of driving by virtue of the certificate can be executed in the course of driving. Instead of having been entered into the certificate, this information may also have been entered as metainformation for the subsequently loadable application software, for example as a manifest file. Thus, although particular applications can continue to run, they are not able to be accessed via the sensor screen.

In one advantageous development, further classification of online service suitability in the course of driving can be performed on the basis of the level of the current speed of travel. Up to 50 km/h for example, and for a further limit value up to 100 km/h, for example, particular contents of online services are authorized still completely, only restrictedly or no longer.

BRIEF DESCRIPTION OF DRAWINGS

Exemplary embodiments of the invention are explained below with reference to FIGS. 1 to 7, in which.

DEATAILED DESCRIPTION OF DRAWINGS

Figure 1:
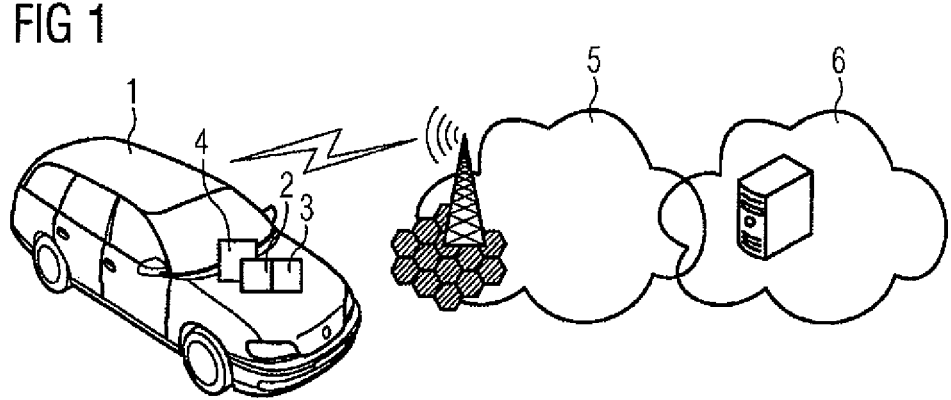
FIG. 1 is a schematic illustration of a system of the proposed type with a vehicle, a control unit, a communication device, a graphical output device, a wireless data transmission network and a server.

FIG. 1 shows a schematic illustration of a system having a vehicle 1, a control unit 2, a communication interface 3, a graphical output device 4, a wireless data transmission network 5 and a server 6. The control unit 2, the communication interface 3 and the graphical output device 4 are situated in the vehicle 1 and form an apparatus according to one embodiment of the invention. The controller 2 is connected to the communication unit 3 and to the graphical output device 4, and the communication interface 3 is connected to the server 6 via the wireless data transmission network 5, with the wireless data interchange being effected via a GPRS network, a UMTS network, a WiMAX connection, another mobile radio network or a WLAN. The apparatus according to the invention is capable of presenting or not presenting particular contents of a called online service via the graphical output unit 4, which is in the form of a sensor screen, for example, on the basis of the driving state. By way of example, the online service may be a television program, an Internet page or a further information service provided via a wireless connection. The driving state is defined by a speed of travel which is above 3 km/h or preferably above 10 km/h or particularly preferably above 15 km/h. In addition, the apparatus may comprise a sensor device which additionally detects the general condition of the driver in terms of tiredness and alcohol consumption for the purpose of authorizing online services in the course of driving.

A method for authorizing an online service in the course of driving provides for the following steps: the driving state of the vehicle (1) is detected. On the basis of the driving state, a check is performed to determine whether a retrieved online service or particular contents of a retrieved online service are authorized for display in the course of driving. Available or ascertainable data relating to the authorizability of the retrieved online service in the course of driving are taken as a basis for either blocking or restrictedly or completely authorizing the retrieved online service. The result is presented via a graphical output device 4.

Figure 2:
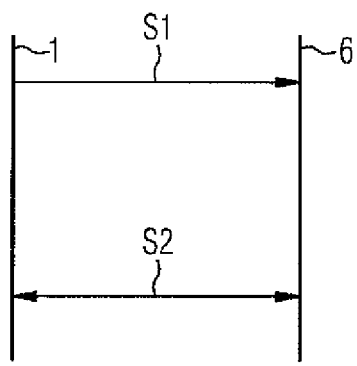
FIG. 2 is a flowchart that shows data interchange between a vehicle and a server without transmission of the driving state.

FIG. 2 presents a flowchart showing data interchange between the vehicle 1 and the server 6 without transmission of the driving state, in accordance with the prior art. In a step S1, the vehicle 1 sends a request for the display of an online service to the server 6. The server 6 reacts and, in a step S2, sends the requested data for the online service to the vehicle 1, and data are interchanged between the server 6 and the vehicle 1.

Figure 3:
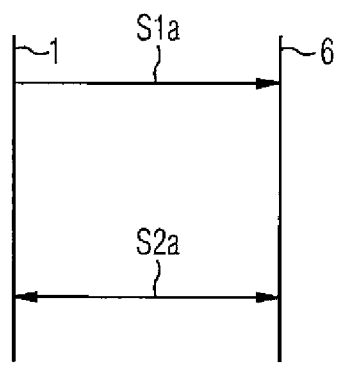
FIG. 3 is a corresponding illustration of data interchange between a vehicle and a server with transmission of the driving state.

FIG. 3 shows a corresponding illustration of data interchange between the vehicle 1 and the server 6 with transmission of the driving state. Together with the request for display of an online service, the vehicle 1 also sends the driving state to the server 6 in a step S1a, in accordance with the invention. The server 6 uses the information about the driving state of the vehicle 1 to check whether the requested online service is sent to the vehicle 1 completely, only with particular contents or not at all.

For the purpose of authorization, the authorization information may be encodable into a certificate directly as an attribute in the case of communication which is protected using a network protocol for secure data transmission. The SSUTLS protocol can be used to protect the data interchange by virtue of the additional 's' after 'http' as hypertext transfer protocol secure.

A certification center allocating user accounts can also issue certificates for online services that can be used safely in the course of driving. The certificates can be issued on the basis of the nature and origin of an online service or after checking a possibly suitable online service. An online service provided directly by an automobile manufacturer or a motor vehicle association taking special account of the attentiveness of the driver to the traffic may have been classified as being able to be used safely in the course of driving.

Information relating to the useability of an online service in the course of driving can also be fetched using authorizations recently stored by the runtime environment, or stored configurations, by comparing the origin data in the network with defined patterns. Authorizations already stored by the runtime environment or stored configurations by virtue of comparison of URLs with defined patterns provide information about the useability of an online service in the course of driving, the defined patterns being able to be firmly prescribed or being able to be configured by a workshop or by a user himself.

In order to allow the information data transmitted by the server 6 to be customized on the basis of driving state, it is possible that when a message or a request for download of an online service is sent, the driving state is transmitted as well.

Furthermore, a URL-rewrite can be effected as soon as the driving state has changed. Alternatively, the information data can also be reloaded (reload) from the server 6. The runtime environment can thus create a new version of the origin data in the network when the driving state changes, whereupon the selected online service provides all, only particular or absolutely no contents on the basis of the driving state.

Alternatively, an online service which contains dynamic contents can request the current vehicle status and customize its presentation accordingly.

A request for the authorization information can also be made by an additional server set up specifically for that purpose.

Figure 4:
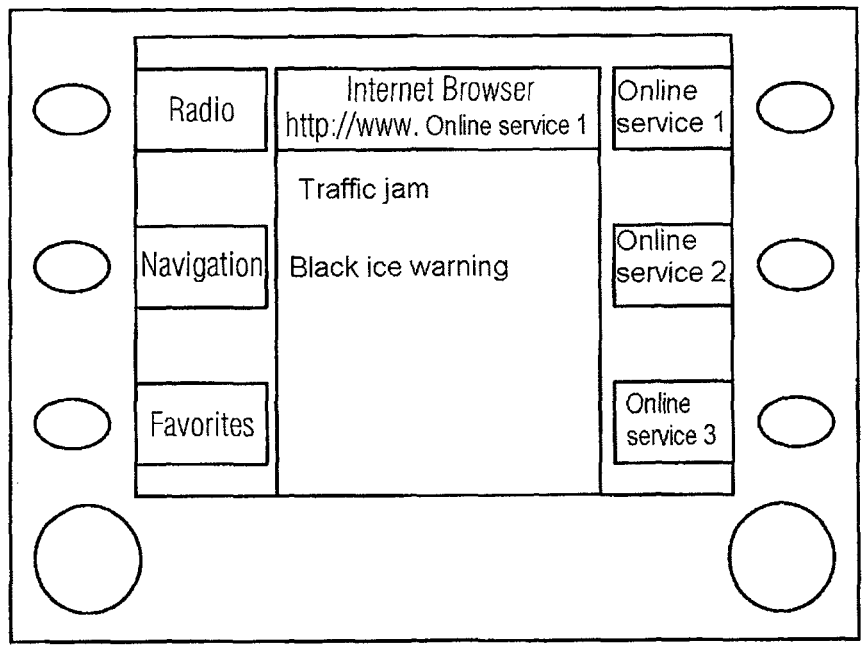
FIG. 4 is a schematic illustration of the graphical output unit in a form according to one embodiment of the invention with a called online service in the case of a stationary vehicle.

FIG. 4 shows a schematic illustration of the graphical output unit 4 designed according to the invention with a called online service in the case of a stationary vehicle 1. In this case, the called online service is presented completely and no authorization is necessary.

Figure 5:
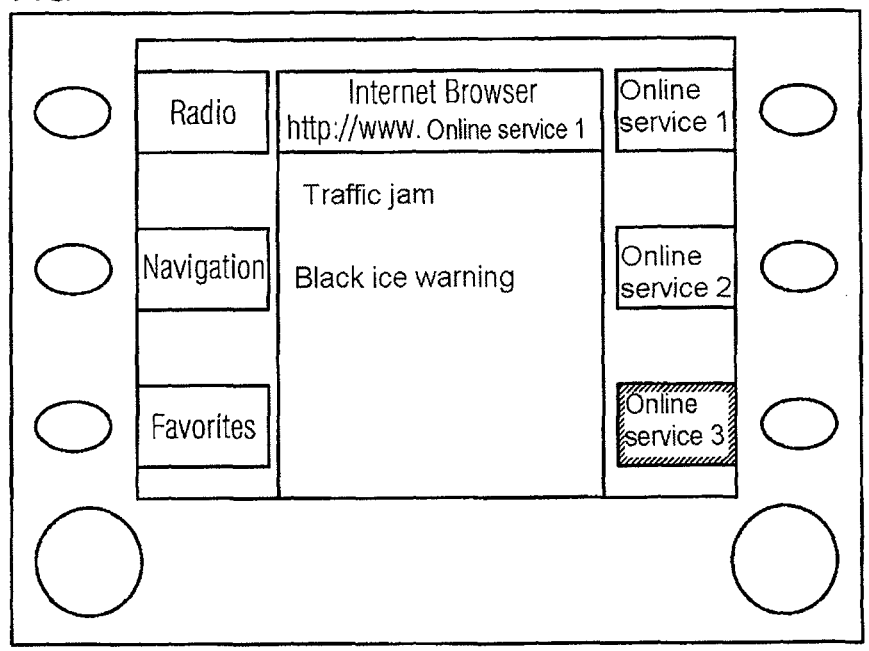
FIG. 5 is a corresponding illustration with a called online service that is authorized in the course of driving in the case of a travelling vehicle.

FIG. 5 shows a corresponding illustration with a called online service which is authorized in the course of driving in the case of a travelling vehicle 1. While the online service 1 and the online service 2 are authorized for calling in the course of driving, this does not apply to online service 3, i.e. online service 3 cannot be retrieved in the course of driving and therefore appears on a grey background on the display.

In the course of driving, only online services which are stored in the control unit 2 can be dialed up. In order to place as little load as possible on the attentiveness of the driver in the course of driving, online services which are permitted in the course of driving can be retrieved using a menu, a softkey or voice recognition.

Online services which are not permitted in the course of driving are displayed as deactivated, for example on a grey background.

Not only requested messages and information but also incoming messages and information, for example in the form of an SMS, can be displayed or not displayed on the basis of driving state. In the case of incoming messages and information, the address of the sender can be checked either using the SSL/TLS protocol when there is an authorized connection to the server or by means of a digital certificate which authorizes the transmitter. For display in the course of driving, it is possible that, in the case of incoming messages and information, the message itself is also digitally signed using a digital certificate.

Only subsequently loadable application software which has been digitally signed by a provider and classified as being able to be used in the course of driving by virtue of the certificate can be executed in the course of driving. Although particular applications can continue to run, they are not able to be accessed via the graphical output unit 4.

In addition, online service suitability in the course of driving can be classified further on the basis of the level of the current speed of travel. Up to 50 km/h, for example, and for a further limit value up to 100 km/h, for example, particular contents of online services are authorized still completely, only restrictedly or no longer.

Figure 6:
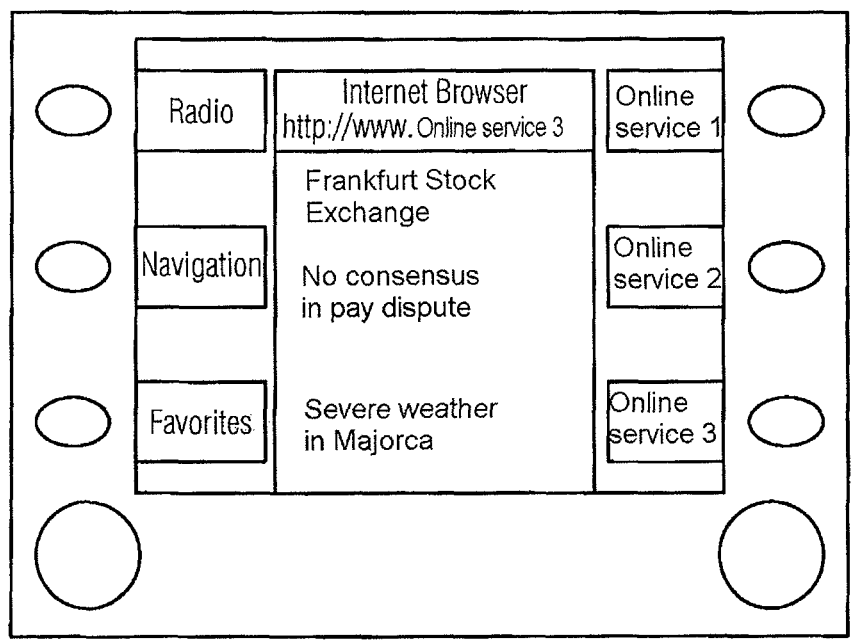
FIG. 6 is a corresponding illustration with a called online service that is not authorized in the course of driving in the case of a stationary vehicle.

FIG. 6 shows a corresponding illustration with a called online service which is not authorized in the course of driving in the case of a stationary vehicle 1. Exclusively in this case, the online service not authorized in the course of driving is also presented completely, and no authorization is necessary. When the driving state changes, the runtime environment can, in accordance with the invention, prompt reloading of a web page or restarting of a running program in order to immediately customize the presentation to suit the altered conditions.

Figure 7:
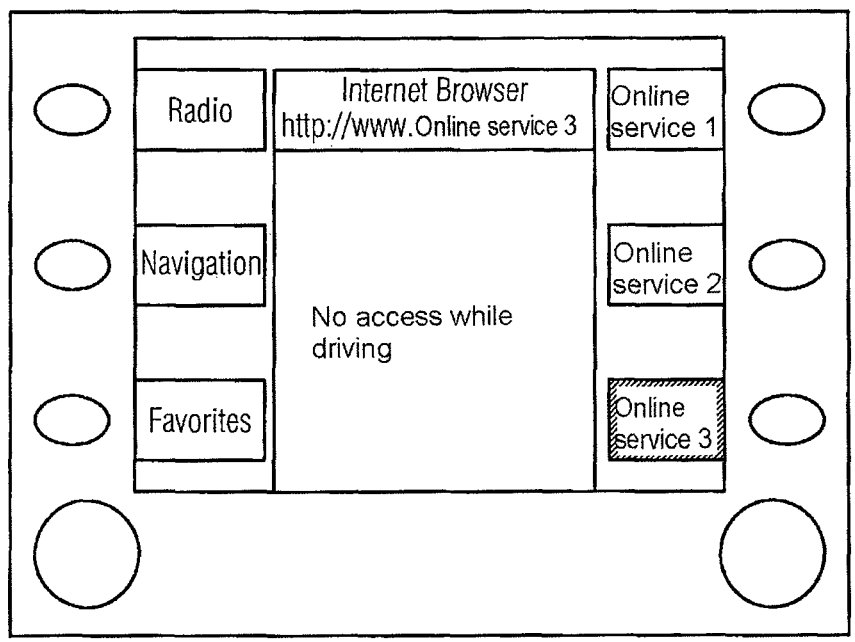
FIG. 7 is a corresponding illustration with a called online service that is not authorized in the course of driving in the case of a travelling vehicle.

FIG. 7 shows a corresponding illustration with a called online service which is not authorized in the course of driving in the case of a traveling vehicle 1. If an online service which cannot be authorized in the course of driving is nevertheless called in the course of driving, the display "no access while driving" appears on the graphical output device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus configured to authorize an online service while driving in a vehicle, comprising:
an electronic control unit configured to authorize particular contents of an online service based at least in part on a driving state;

a graphical output device coupled to the electronic control unit and configured to display the particular contents; and a communication interface coupled to the electronic control unit for wireless data interchange with a server that is not situated in the vehicle.

2. The apparatus as claimed in claim 1, further comprising at least one sensor device configured to capture a condition of a driver.

3. The apparatus as claimed in claim 1, wherein the graphical output device is a sensor screen.

4. A system for authorizing an online service while driving in a vehicle, comprising:
   a server that is not situated in the vehicle; and
   an apparatus in the vehicle comprising:
      an electronic control unit configured to authorize particular contents of an online service based at least in part on a driving state;
      a graphical output device coupled to the electronic control unit and configured to display the particular contents; and
      a communication interface coupled to the electronic control unit for wireless data interchange with the server and which is connected to the communication interface for the purpose of data interchange via a wireless link.

5. A method for authorizing an online service while driving in a vehicle, in which wireless interchange with a server that is not situated in the vehicle is used to authorize particular contents of an online service on the based at least in part on a driving state, comprises:
   detecting the driving state of the vehicle;
   checking whether particular contents of a retrieved online service are authorized for display in the course of driving based at least in part on the driving state;
   one of blocking, restrictedly authorizing, and completely authorizing the retrieved online service based at least in part on one of available and ascertainable data relating to the authorizability of the retrieved online service in the course of driving; and
   displaying the result of the authorization via a graphical output device on which the retrieved online service one of cannot be retrieved, can be retrieved restrictedly, and can be retrieved completely.

6. The method as claimed in claim 5, wherein the wireless data interchange is at least one of a GPRS network, a UMTS network, a WiMAX connection, another mobile radio network, and a WLAN.

7. The method as claimed in claim 5, wherein the authorization information is encoded into a certificate directly as an attribute in a case of communication that is protected using a network protocol for secure data transmission.

8. The method as claimed in claim 5, wherein a certification center allocating user accounts is configured to issue certificates for online services that are used safely in the course of driving.

9. The method as claimed in claim 7, wherein the certificate is issued based on a nature and origin of an online service or after checking a possibly suitable online service.

10. The method as claimed in claim 5, further comprising fetching information relating to the useability of an online service in the course of driving using at least one of authorizations recently stored by a runtime environment and stored configurations by comparing the origin data in the network with defined patterns.

11. The method as claimed in claim 10, wherein the defined patterns are one or more of firmly prescribed, configured by a workshop, and user set.

12. The method as claimed in claim 5, wherein when a message or a request for download of an online service is sent, the driving state is also transmitted.

13. The method as claimed in claim 5, wherein the runtime environment creates a new version of the origin data in the network when the driving state changes, whereupon the selected online service provides one of all, only particular, and absolutely no content based on the driving state.

14. The method as claimed in claim 5, wherein an online service which contains dynamic contents requests the current vehicle status and customizes the presentation of the online service accordingly.

15. The method as claimed in claim 5, wherein the runtime environment prompts reloading of a web page or restarting of a running program as soon as the driving state of the vehicle changes.

16. The method as claimed in claim 5, wherein in the course of driving it is only possible to access online services stored in the control unit.

17. The method as claimed in claim 5, wherein online services that are permitted in the course of driving are retrieved using one of a menu, a softkey, and voice recognition.

18. The method as claimed in claim 5, wherein online services that are not permitted in the course of driving are displayed as deactivated.

19. The method as claimed in claim 5, wherein requested messages and information and incoming messages and information are one of displayed and not displayed based on the driving state.

20. The method as claimed in claim 5, wherein for incoming messages and information an address of a sender is checked either using the network protocol for secure data transmission when there is an authorized connection to the server or by a digital certificate that authorizes the transmitter.

21. The method as claimed in claim 5, wherein for incoming messages and information the message itself is digitally signed using a digital certificate.

22. The method as claimed in claim 5, wherein only subsequently loadable application software that has been digitally signed by a provider and classified as being able to be used in the course of driving by virtue of the certificate can be executed in the course of driving.

23. The method as claimed in claim 5, wherein a request for authorization information is made by an authorization server set up specifically for that purpose.

24. The method as claimed in claim 5, wherein further grading of online service suitability in the course of driving is performed based on a level of speed of travel.

25. The method as claimed in claim 18, wherein the deactivated online services are displayed on a grey background.

26. The apparatus as claimed in claim 1, wherein the electronic control unit one of blocks, restrictedly authorizes, and completely authorizes the online service based at least in part on one of available and ascertainable data relating to the authorizability of the online service in the course of driving.

* * * * *